US010803497B2

(12) United States Patent
Turner et al.

(10) Patent No.: US 10,803,497 B2
(45) Date of Patent: Oct. 13, 2020

(54) SYSTEM AND METHODS TO FACILITATE IN-SITU EVALUATIONS

(71) Applicant: HomeAway.com, Inc., Austin, TX (US)

(72) Inventors: Ryan Hedley Turner, Austin, TX (US); Daniel Steven Haligas, Panama City, FL (US); Velayudhan Pillai Venugopal, Austin, TX (US); Alex Holm Devine, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 1522 days.

(21) Appl. No.: 14/512,279

(22) Filed: Oct. 10, 2014

(65) Prior Publication Data

US 2016/0104216 A1    Apr. 14, 2016

(51) Int. Cl.
*G06Q 30/02*      (2012.01)
*G06Q 30/06*      (2012.01)
*G06Q 10/10*      (2012.01)

(52) U.S. Cl.
CPC ......... *G06Q 30/0282* (2013.01); *G06Q 10/10* (2013.01); *G06Q 30/0645* (2013.01)

(58) Field of Classification Search
None
See application file for complete search history.

(56) References Cited

U.S. PATENT DOCUMENTS

| | | | | |
|---|---|---|---|---|
| 2002/0075329 A1* | 6/2002 | Prabhu | ................... | G06F 3/0481 715/854 |
| 2003/0120525 A1* | 6/2003 | Feser | ..................... | G06Q 10/02 705/5 |
| 2007/0255792 A1* | 11/2007 | Gronberg | .............. | H04L 51/066 709/206 |
| 2010/0211866 A1* | 8/2010 | Nicholas | ........... | G06F 17/30905 715/234 |
| 2011/0178885 A1* | 7/2011 | Xiong | ..................... | G06Q 20/20 705/16 |
| 2012/0246004 A1* | 9/2012 | Book | ..................... | G06Q 30/02 705/14.58 |

(Continued)

OTHER PUBLICATIONS

Cisco, "Wi-Fi Location-Based Services 4.1 Design Guide", Jan. 30, 2014, https://www.cisco.com/c/en/us/td/docs/solutions/ Enterprise/ Mobility/WiFiLBS-DG/wifich2.html (Year: 2014).*

*Primary Examiner* — Paul R Fisher
(74) *Attorney, Agent, or Firm* — Knobbe, Martens, Olson & Bear, LLP

(57) ABSTRACT

Review data associated with a guest experience at an event, such as a vacation rental, for example, is transmitted over a communications network to one or more networked computing devices for processing the review data into a review data file for publication. The review data may be generated by an application executing on a processor of a client device such as a smartphone, tablet or pad. The review data may include access credentials and location data that may be processed to validate that the review data is legitimate. The review data may include media content captured in-situ at the event while the guest is experiencing the event. Prior to publishing a review data file, an owner may receive a notice and/or a copy of the pending review data file and the owner may take action to cure a less than stellar review and/or amend the review prior to publication.

20 Claims, 10 Drawing Sheets

(56) References Cited

U.S. PATENT DOCUMENTS

2013/0047034 A1* 2/2013 Salomon ................ H04W 4/00
            714/18
2014/0274122 A1* 9/2014 Tseng ...................... G01S 19/14
            455/456.1

* cited by examiner

SYSTEM AND METHODS TO FACILITATE IN-SITU EVALUATIONS

FIELD

The present application relates generally to systems, software, electronic messaging, mobile computing and communication devices, commerce, and electronic commerce. More specifically, systems, methods and software to facilitate in-situ evaluations are disclosed.

BACKGROUND

Travelers and owners may both benefit from goodwill associated with a positive experience the traveler has in regards to a stay at a rental owned by the owner. In some scenarios, the stay may be related to a date and/or time range that the traveler arrives or checks into a vacation rental and another date and/or time that the traveler checks out of the vacation rental, for example. In some instances, the traveler may wait until some period of time has passed before taking the time to review the property that the traveler stayed at. In some examples, the traveler may have had a positive review of the property (e.g., 4 or 5 stars in a five star system where 5 stars is the highest approval rating and 1 star is the lowest approval rating). After the passage of time the travelers recollection of their experience may change, and what would have been a positive review may turn into a more negative review (e.g., 3 stars or lower).

A less than positive review that may occur due to a travelers change in circumstances after the stay or due to a traveler's lack of accurate recollection about the stay may lead to reviews that do not accurately reflect the actual sentiment the traveler had during the stay. Stays that are accurately reviewed as being positive may benefit both traveler and owner by increasing rental opportunities for the owner and by leaving a favorable impression on the traveler that may result in future stays by the traveler. Moreover, some owners may not directly manage some or all of the aspects of the logistics of a stay and may defer some or all tasks to an agent or vacation rental company. Stays that are accurately reviewed as being positive may also benefit the agent/vacation rental company by generating good will that may garner new and repeat stays from individuals who read the positive reviews.

Thus, there is a need for devices, systems, methods and software that facilitate in-situ evaluations of events to accurately capture sentiment about the event contemporaneously with the event.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
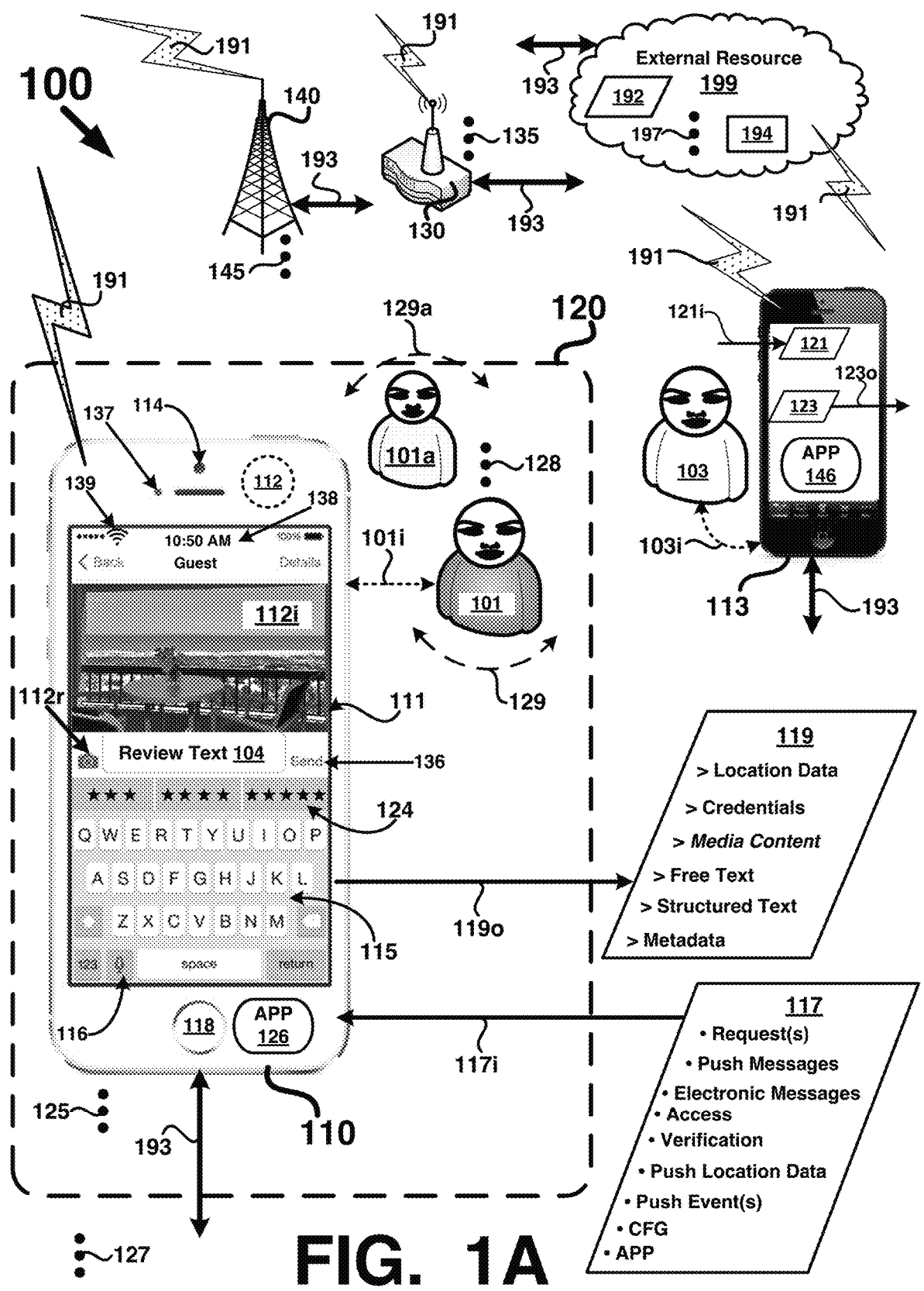
FIG. 1A depicts one example of a block diagram of a system operative to provide in-situ evaluations.

Attention is now directed to FIG. 1A where a block diagram of a system 100 operative to provide in-situ evaluations is depicted. In FIG. 1A a guest 101 may be experiencing an event 120 at location, such as a stay at a vacation rental property, for example. There may be more than one guest 101 and there may be one or more other individuals associated with guest 101 (e.g., spouse, friends, domestic partner, relatives, children, business associates, etc.) as denoted by 128. Guest 101 and/or associates 101a may be mobile (129, 129a) and move about to one or more other events denoted by 127 while at the location, such as visits to bars, restaurants, entertainment, business, venue, parks, sporting events, local attractions, shopping, etc. The location where one or more events (e.g., 120, 127) may occur may be a city, a town, a ship, a resort, a park, a festival, a hotel, a motel, etc. The location may cover a small area (e.g., 100 meters or less) or a large area (100 miles or less).

Guest 101 may have a client device 110 (e.g., a smartphone, tablet, pad, laptop, PDA, gaming device, etc.) that may be in communication with other systems or resources, such as wireless 191 and/or wired 193 communication with an external resource 199 (e.g., Internet, Cloud, etc.), wireless access point 130, cellular communications network 140, just to name a few. There may be more than one client device 110 as denoted by 125, for example, associate 101a may have another client device (not shown), or the guest 101 may have another client device (not shown), such as a tablet or pad, for example. There may be more or fewer wireless access points 130 and/or cellular communications network 140 than depicted in FIG. 1A.

Wireless communications may include but is not limited to WiFi, WiMAX, Bluetooth, near filed communications (NFC), and cellular (e.g., 2G, 3G, 4G), for example. Wired communications may include but is not limited to local area network, universal serial bus, and lightning, for example. External resource 199 may include computing resources 194 and data storage resources 192, and there may be more or fewer computing resources 194 and data storage resources 192 than depicted as denoted by 197.

As one non-limiting example of an event, guest 101 may be a traveler who has booked a reservation for a stay at a vacation rental property in a location (e.g., Park City, Utah). The stay may include typical beginning dates and/or times and ending dates and/or times, such as a check-in time and date and a check-out time and date, for example. An owner 103 of the vacation rental property may desire positive reviews from the guest 101 and the guest 101 may desire a positive stay experience. A positive stay experience may be evidenced by a positive review drafted by the guest 101 using client device 110 and its associated systems to draft the review. System 100 may be operative to allow the guest to provide the review during a time period that may be contemporaneous with the event 120. For example, if the stay will end at a 12:00 PM check-out time on the end date for the stay, it may be desirable for the guest 101 to draft the review prior to the check-out time because the experience of the stay may be still fresh in the mind of the guest 101. Accordingly, guest 101 may interact with 101*i* the client device 110 to enter data relevant to the experience the guest 101 had during his/her stay for event 120. Moreover, an application 126 (APP) executing on client device 110 may notify or otherwise remind guest 101 to review the event 120 using one or more systems of client device 110, such as display 111, a vibration engine (not shown), a microphone 137, speakers (not shown), and a user interface (UI), such as keyboard 115, for example. The APP may receive and/or generate messages or images displayed on display 111 of client device 110 to remind or otherwise prompt guest 101 to proffer a review of the event 120.

The review may include media content, such as a video and/or a still image captured using an image capture system of client device 110, such as a first camera 112 (e.g., a rear facing camera) or a second camera 114 (e.g., a front facing camera). APP 126 may prompt (e.g., using audio, video, text, etc.), guest 101 to capture an image of a favorite aspect of the event, such as a view afforded by the vacation rental. To that end, guest 101 may capture an image 112*i* of an ocean view to be included in the review using first camera 112. Other types of images, such as a self-portrait (e.g., a selfie) of the guest 101 and/or associates 101*a* enjoying the beach or other aspect of the event 120. For example, second camera 114 may be used to capture an image for a selfie. APP 126 may activate an icon, such as a camera icon 112*r* as a reminder for the guest 101 to capture media content for the review. A microphone icon 116 may be activated by APP 126 to prompt or otherwise remind the guest to include a sound clip (e.g., ocean sounds) or voice commentary for the review using microphone 137. Keyboard 115 may be used by guest 101 to enter review text 104 to be included in the review of the event 120. The text entered by guest 101 may be free text as typed or otherwise entered by guest 101 using keyboard 115 or other interface device (e.g., a Bluetooth keyboard paired with client device 110). APP 126 may present event rating choices on display 111, such as a five-star rating system 124 for the guest 101 to select the star rating that most closely matches his/her sentiment regarding the stay, such as four to five stars for a favorable experience, three stars for an acceptable experience, and one to two stars for an unfavorable experience, for example. The star rating may be structured text that is selected from icons or other objects presented on display 111 (e.g., a touchscreen display) such as separate selectable fields for each star rating as depicted by 124.

APP 126 or other component of system 100 may solicit or otherwise notify or prompt guest 101 to proffer the review at a time that is near the end time and/or date for the stay. As one example, if the check-out time for the last day of the stay is 12:00 PM, then at time of 10:50 AM (e.g., as determined by a clock 138 on client device 110), the guest 101 may be reminded to compose a review of the event 120 (e.g., contemporaneous with the stay) before the check-out time. The reminder may include but is not limited to an electronic message, a voice mail, a text, an email, a tweet, an instant message, vibrating client device 110, information presented on display 111, just to name a few. As described above, the reminder may include a request for the guest 101 to capture media content for the review of the event 120 (e.g., image 112*i*). After the guest 101 has completed composing the review, including media content, if any, a send icon 136 or return/enter key on keyboard 115 may be activated to communicate data for the review (e.g., review data) to an external system using one or more communications systems of client device 110, such as one or more wired 193 (e.g., USB, Lightning, LAN) and/or wireless 191 (e.g., WiFi, Cellular, NFC, Bluetooth), communications interfaces.

APP 126 and/or other systems in communication (191, 193) with APP 126 via client device 110 may operate to ensure that the review is legitimate and originates from a location that is consistent with a location for the event 120. APP 126 may access from client device 110 and/or external systems (e.g., external resource 199 or other), location data (e.g., GPS, geolocation or other locations based services) and/or credential data associated with client device 110 (e.g., access credentials for WiFi and/or wired networks) and/or guest 101. Biometric or other data may be used to verify identity and/or credentials of guest 101, such as a biometric sensor 118 (e.g., a fingerprint reader or scanner) on client device 110.

Owner 103 or an agent acting on behalf of owner 103 may provide as part of the event 120, access credentials to a WiFi network (e.g., wireless router 130 at the vacation rental) for guest 101 to access during the stay. Availability of the WiFi network at the event 120 may be displayed by icon 139 on client device 110. APP 126 may access via client device 110 wireless address information (e.g., MAC address, Bluetooth ID, etc.) of the client device 110 and other wireless devices the client device 110 communicates with. Received signal strength indicator (RSSI), signal ping times, or other indicators may be used to verify credentials of client device 110 associated with guest 101. As one example, if guest 101 is given access credentials (e.g., SSID and wireless network key/password) for a wireless network provided by the owner 103 for use by guests at the vacation rental unit, then access to that network via client device 110 may be used by APP 126 to provide data to an external system to verify that a review data transmitted by client device 110 matches credentials for the event 120.

Locations tracking capabilities and/or systems accessed by or available to client device 110 may be used to determine if review data is originating from a locus within a range of the event 120 (e.g., measured in distances of feet, meters, miles, kilometers, etc.) For example, if the stay for event 120 is in Lake Tahoe, Calif. and the location data indicates the review data is being communicated from Las Vegas, Nev., then the distance between Lake Tahoe, Calif. and Las Vegas, Nev. may be outside a locus for a legitimate location for the review data to originate (e.g., several hundred miles between the event and the origin of the review data). Further to the example, if the review and associated media content are to be composed while the guest 101 is at the event 120 (e.g., in-situ from a room of the vacation rental), then the locus may be 30 meters of less. All events need not be tied to a rental and some events may take place at a bar, restaurant, arena, stadium, and the locus may be a larger or smaller distance based on the type of event. As another example, if the event occurs in a national park, the locus may be 50 miles or less. Actual values for the locus may be application dependent and are not limited to the examples herein. Cellular communications networks 140 located near event 120 may be used to verify location for guest 101 via one or more cellular communications networks 140 (e.g., cell towers) that are accessed by client device 110 (e.g., client device 110 having 2G, 3G, 4G cellular radios). Wide area and/or public WiFi networks, such as WiMAX, located in vicinity of event 120 and detected and/or accessed by client device 110 and/or by the WiMAX network, may be used to determine location data for a client device 110 associated with guest 101. Although a locus may be determined by geo-location data, a locus may also be determined by information and/or signals including but not limited to location data from systems internal to the client device 110, location data from systems external to the client device 110 (e.g., external resource 199, 180, 130, 140), location data from systems internal to a communications interface (e.g., 180, 130, 140), location data from systems external to (e.g., external resource 199) a communications interface (e.g., 180, 130, 140), radio frequency (RF) signal strength as measured by a communications interface (e.g., 180, 130, 140) in communications with the client device 110, RSSI as measured by a communications interface (e.g., 180, 130, 140), signal ping times as measured by a communications interface (e.g., 180, 130, 140), just to name a few, for example. As one example, location data may be determined to be unreliable and/or unverifiable if RSSI in RF signals transmitted by the client device 110 are below a threshold value, and/or if RF signal strength from RF signals transmitted by the client device are below a threshold value. RSSI and/or RF signal strength that are below their respective threshold values may be indicative of a distance between the client device 110 and a communications interface (e.g., 180, 130, 140) being too great for the client device 110 (e.g., and its associated guest 101) to be within a locus of the event.

As another example, location data and/or credential data associated with owner device 113 if received in review data associated with a stay by guest 101 at a vacation rental of owner 103 may be invalidated or ignored because the location data is outside the locus for the event (e.g., event is in Lake Tahoe, Calif. and the owner 103 lives in Dallas, Tex. and the location data from owner device 113 is consistent the review data originating near Dallas, Tex.). Similarly, access credentials used by owner device 113 may not match those for the WiFi network at the vacation rental. Although and owner 103 was used as an example, the location data and credential data from other non-guest devices may lead to the same result, invalidation of fraudulent or erroneous review data due to that data not matching the expected location data and/or credentials data.

In FIG. 1A, APP 126 executing on a computing system of client device 110 may access hardware and/or software systems and/or resources of client device 110 to transmit 119o data 119 to one or more external systems. Data 119 may include but is not limited to location data, credentials, media content, free text, structured text, and metadata, for example. APP 126 may receive 117i data 117 from one or more external systems. Data 117 may include but is not limited to request(s) (e.g., to compose a review), push messages (e.g., to compose a review, information on other events for guest 101 to consider), electronic messages (e.g., text, email, tweets, IM's), verification data (e.g., location data, access credential data), push location data (e.g., location data for other events the guest 101 may partake in), push events (e.g., events related to offers from business for the guest 101 to consider), applications (APP's) for client device 110, and configuration data (CFG) (e.g., to configure client device 110).

As will be described below, after review data (e.g., 119) transmitted by APP 126 via client device 110 is received by one or more external systems, the review data may be verified (e.g., for location data and/or credential data) and formatted for publication (e.g., to a web page, bulletin board, newsletter, etc.). A verified review may be queued for publication at a later time and prior to being published; owner device 113 may receive a version of the pending review for owner 103 to consider and optionally act on before the review is published to a broader audience (e.g., people searching for vacation rentals for future stay dates). Owner device 113 may receive 121i a pending review (e.g., in an email message or other form of electronic messaging). If the review is suboptimal (e.g., less than four stars or free text indicating guest dissatisfaction), owner 103 may uses owner device 113 or some other device to either contact the guest 101 to cure any grievance the guest 101 may have or to amend the review to rebut the suboptimal review. In some examples, the owner 103 may have cured the cause for the suboptimal review and the owner 103, guest 101 or both may communicate (119o, 123o) an amended review that will be published instead of the initial review. Accordingly, output 123o from owner device 113 may include data 123 for an amended review or data used to cure the grievance of guest 101, for example. An application executing on owner device 113 may process incoming data 121 and outgoing data 123.

Figure 1B:
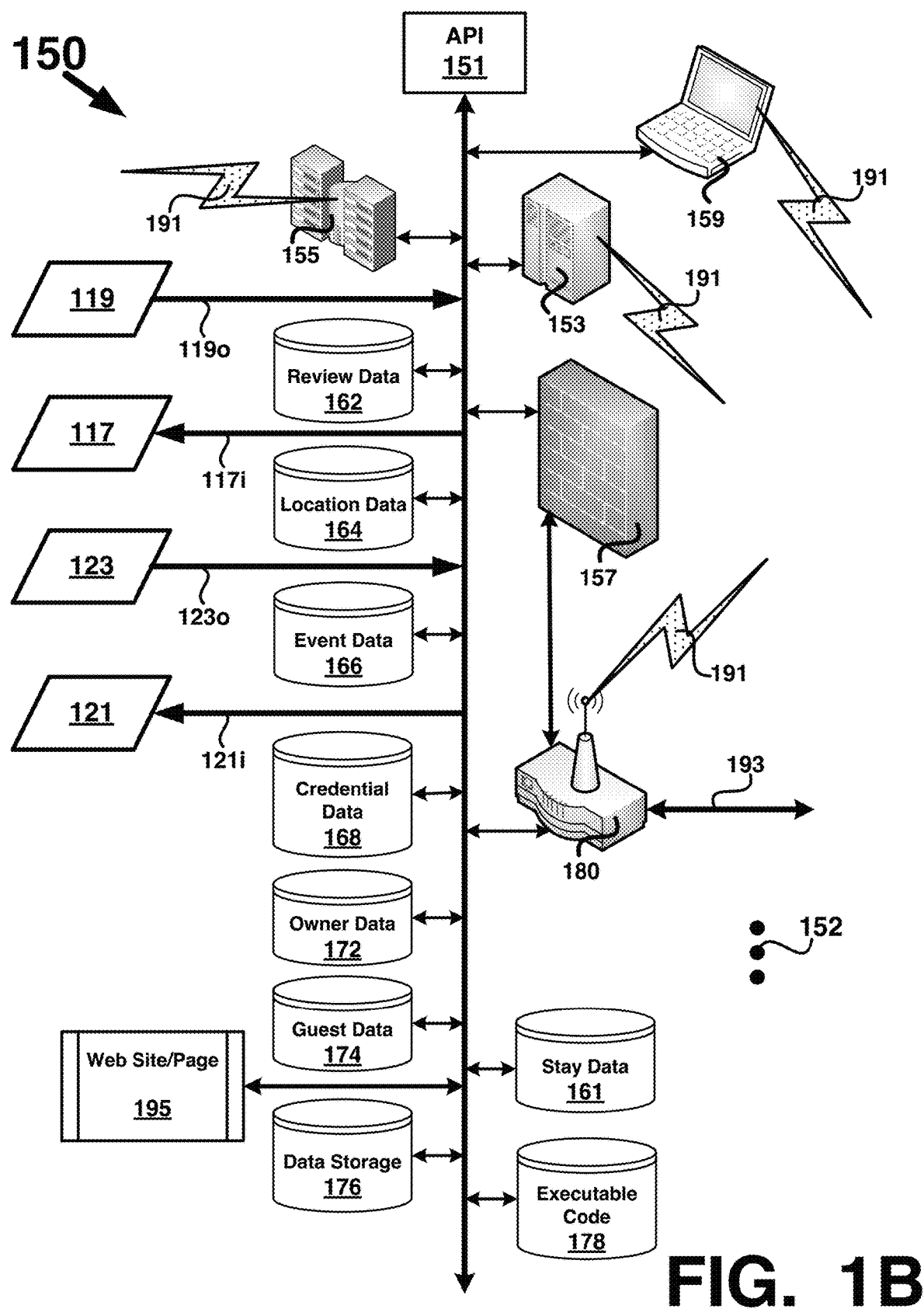
FIG. 1B depicts one example of a block diagram of a networked system operative to generate reviews from data received from in-situ evaluations.
Figure 2:
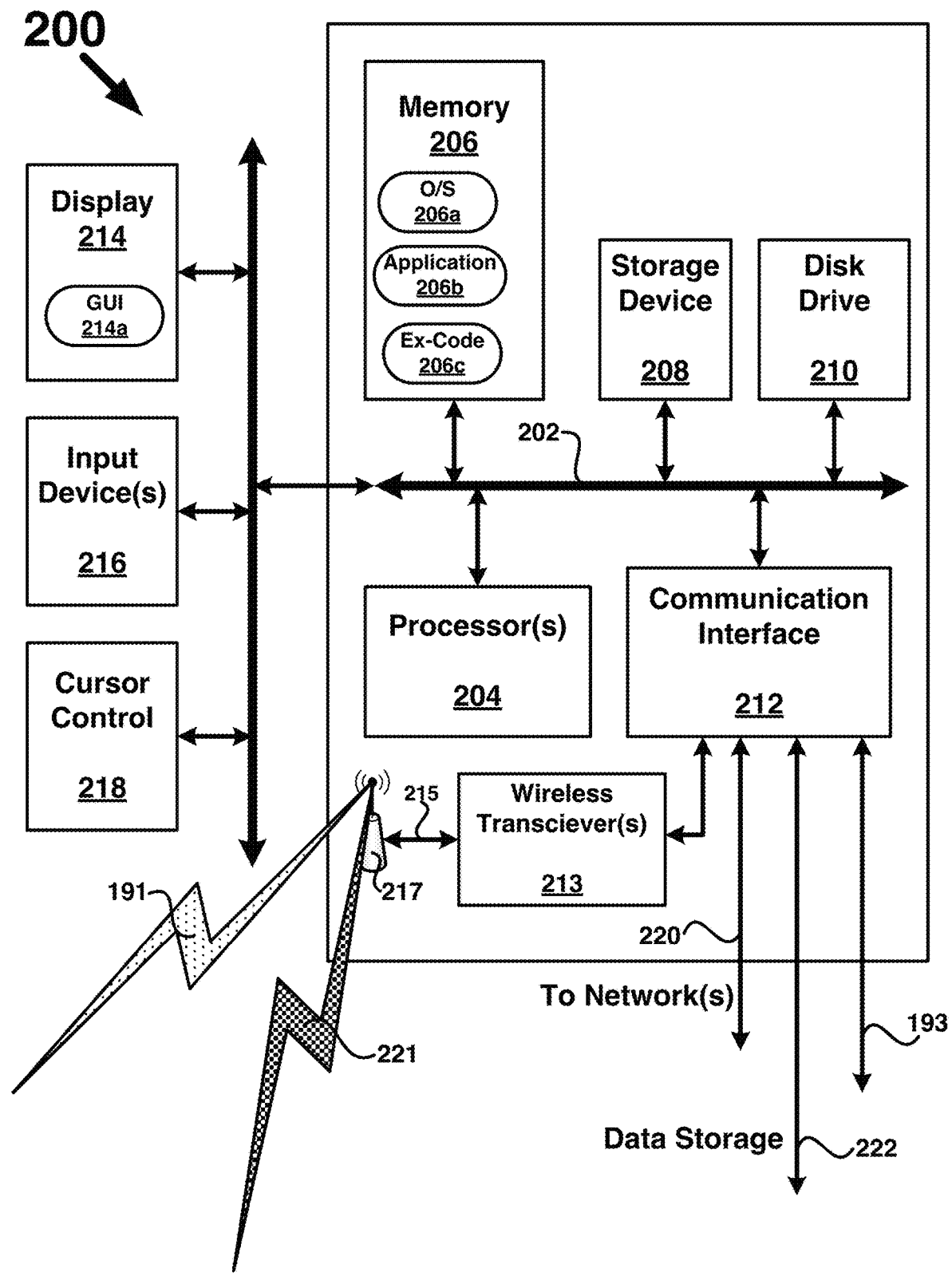
FIG. 2 depicts one example of a computer system.

FIG. 2 illustrates an exemplary computer system 200 suitable for use in one or more systems, devices, compute engines, apparatus, client devices, wireless devices, wireless systems, backend systems, front end systems, host devices or others described in reference to FIGS. 1A-1B and 3A-6. In some examples, computer system 200 may be used to implement computer programs, algorithms, an application (APP), an application programming interface (API), configurations, methods, processes, or other software to perform the above-described techniques. Computer system 200 may include a bus 202 or other communication mechanism for communicating information, which interconnects subsystems and devices, such as one or more processors 204 (e.g., μC, μP, DSP, ASIC, FPGA, Baseband, etc.), system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi, Cellular), display 214 (e.g., CRT, LCD, LED, OLED, touch screen), input device 216 (e.g., keyboard, stylus, touch screen, mouse, track pad), and cursor control 218 (e.g., mouse, trackball, stylus). Some of the elements depicted in computer system 200 may be optional, such as elements 214-218, for example, and computer system 200 need not include all of the elements depicted. Display 214 may present a user interface (UI), such as a graphical user interface (GUI) 214a. Memory 206 may include computer executable programs and/or data embodied in a non-transitory computer readable medium, such as an operating system (OS) 206a, an application (APP) 206b, and executable code (Ex-Code) 206c, for example.

According to some examples, computer system 200 performs specific operations by one or more processors 204 executing one or more sequences of one or more instructions stored in system memory 206. Such instructions may be read into system memory 206 from another non-transitory computer readable medium, such as storage device 208 or disk drive 210 (e.g., a HDD or SSD). In some examples, circuitry may be used in place of or in combination with software instructions for implementation. The term "non-transitory computer readable medium" refers to any tangible medium that participates in providing instructions and/or data to processor(s) 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media may include coaxial cables, copper wire, and fiber optics, including wires that comprise bus 202 for transmitting a computer data signal or other signals (e.g., from hardware or circuitry). In some examples, execution of the sequences of instructions may be performed by a single computer system 200. According to some examples, two or more computer systems 200 coupled by communication link 220 (e.g., LAN, Ethernet, PSTN, USB, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in disk drive 210, or other non-volatile storage for later execution. Computer system 200 may optionally include a wireless transceiver 213 coupled with the communication interface 212 and coupled 215 with an antenna 217 for receiving and generating RF signals (191, 221), such as from a WiFi network, WiMAX network, BT radio, Cellular network, networked computing resources, external resource 199, client devices (e.g., 110), owner devices (e.g., 113), near field communication (NFC), satellite network, data storage network, or other wireless network and/or wireless devices, for example. Examples of wireless devices (e.g., client devices) may include but is not limited to those depicted in FIGS. 1A-1B and 6. Communications interface 212 may be coupled 222 with data storage external to computer system 200. Communications interface 212 may be coupled 193 with external resources and/or systems, such as those depicted in FIGS. 1A-1B and 6, for example.

Moving on to FIG. 1B, where one example of a block diagram of a networked system 150 operative to generate reviews from data (e.g., 119 and/or 123) received from in-situ evaluations (or amended versions of an in-situ evaluation) is depicted. Networked system 150 may be in wired 193 and/or wireless 191 communications with other devices and systems, including but not limited to external resource 199 and its associated resources (192, 194), client device 110, owner device 113, and devices of associate(s) 101a, just to name a few. Networked system 150 may include resources in communications with one another, that may include but is not limited to an application program interface (API) 151, one or more laptop computers 159, one or more servers 153, a communications interface 180 that may include wireless 191 and wired 193 links and may also include a firewall 157, one or more server farms 155, data storage 176, review data 162, location data 164, event data 166, access credentials data 168, owner data 172, guest data 174, stay data 161, and executable code 178. In some examples, data storage 176 may include one or more of the other data storage categories (e.g., 162-174, 178). In other examples, data storage resources accessed by networked system 150 may be external to networked system 150 (e.g., positioned in external resource 199). One or more of the flows depicted in FIGS. 3A-5 may be implemented using executable code 178 and/or API 151, for example. For purposes of explanation, a computing resource (e.g., 153, 155, 159) depicted in FIG. 1B may be referred to as a networked computing device and a data storage resource (e.g., 162-174, 178, 183) may be referred to as data storage. For example, data 119 may be received by networked computing resource 153 via communications interface 180. In some examples, a computing device that transmitted the data 119 may be referred to as a client device (e.g., 110).

Review data 162 may include review data and/or amended review data (119, 123), and may include formatted reviews for publication or queued for publication (e.g., at some later time, such as after owner 103 has had an opportunity to review, cure or rebut the pending review). Review data 162 may include location data and/or credential data from a guest device (e.g., 110) that may be compared to location data in 164 and/or credential data in 168. Review data 162 may include review data files for formatted reviews and may include amended review data files. In some examples, data 119 includes amended review data.

Location data 164 may include locations (e.g., GPS data and/or other location data) associated with events (e.g., events in 166) and locations around events (e.g., in approximately the same locale as an event). Location data 164 may include locations associated with owners 103 for use in verifying location data for amended review data transmitted by an application executing on an owner device (e.g., 113). Examples of location around an event may include but are not limited to a park across the street from an event, a cafe of coffee shop down the street from an event, etc. Examples of owner locations may include location data associated with use of the user device 113, such as location data from cellular networks (e.g., in the city or state the owner lives in), WiFi networks, WiMAX networks, etc.

Event data 166 may include data for events, such as a vacation rental, an entertainment venue, a bar, a grocery store, a bakery, goods, services, business, restaurants, etc. that may be the primary event for guest 101 or may be associated with activities the guest 101 partakes of during his/her stay at the primary event (e.g., the stay at the vacation rental).

Credential data 168 (e.g., access credentials) may be a data store where access data is retained for various events, owner properties, etc. For example, credential data 168 may include credentials for WiFi access points in owner properties, businesses that may be promoted by the owner 103 or by an agent acting on behalf of the owner, etc. Other forms of credentials may be included in credential data 168, such as access credentials for guest devices, locks or doors needed to gain access to a rental property or other protected area associated with a stay at an event, for example.

Owner data 172 may include data about owners (e.g., 103), such as property addresses, owner address and contact information, email accounts, account information for a vacation rental agency the owner uses to manage stays by guests, data on owner devices 113 (e.g., MAC address or other forms of device ID, etc.). Guest data 174 may include data about guests (e.g., 101), such as addresses and contact information, email accounts, guest demographics, data on guest devices 110 (e.g., MAC address or other forms of device ID, etc.), financial accounts for deposits, payments, refunds, etc. Stay data 161 may include data for an event such as stay dates, check-in/check-out times, event address, event categories for different types of events (e.g., vacation rental events, restaurant events, casino events, etc.). Data storage 176 may be used as a data store that may be accessed by other components internal to and/or external to networked system 150. Networked system 150 may include more or fewer resources than depicted in FIG. 1B as denoted by 152.

Guest devices (110, 110a) and/or owner devices 113 may communicate (191, 193) with networked system 150 via a Web Site/Web Page 195 (e.g., using a browser or application on a laptop, PC, wireless device, smartphone, pad, tablet, touch screen device, etc.). Information (117, 119, 121, 123) may be viewed, entered, transmitted, received, or otherwise communicated (191, 193) between networked system 150 and another device (e.g., 110, 110a, 113, etc.) using Web Site/Page 195. Reviews, amended reviews or other data associated with event 120 or other events may be communicated via Web Site/Page 195.

Figure 3A:
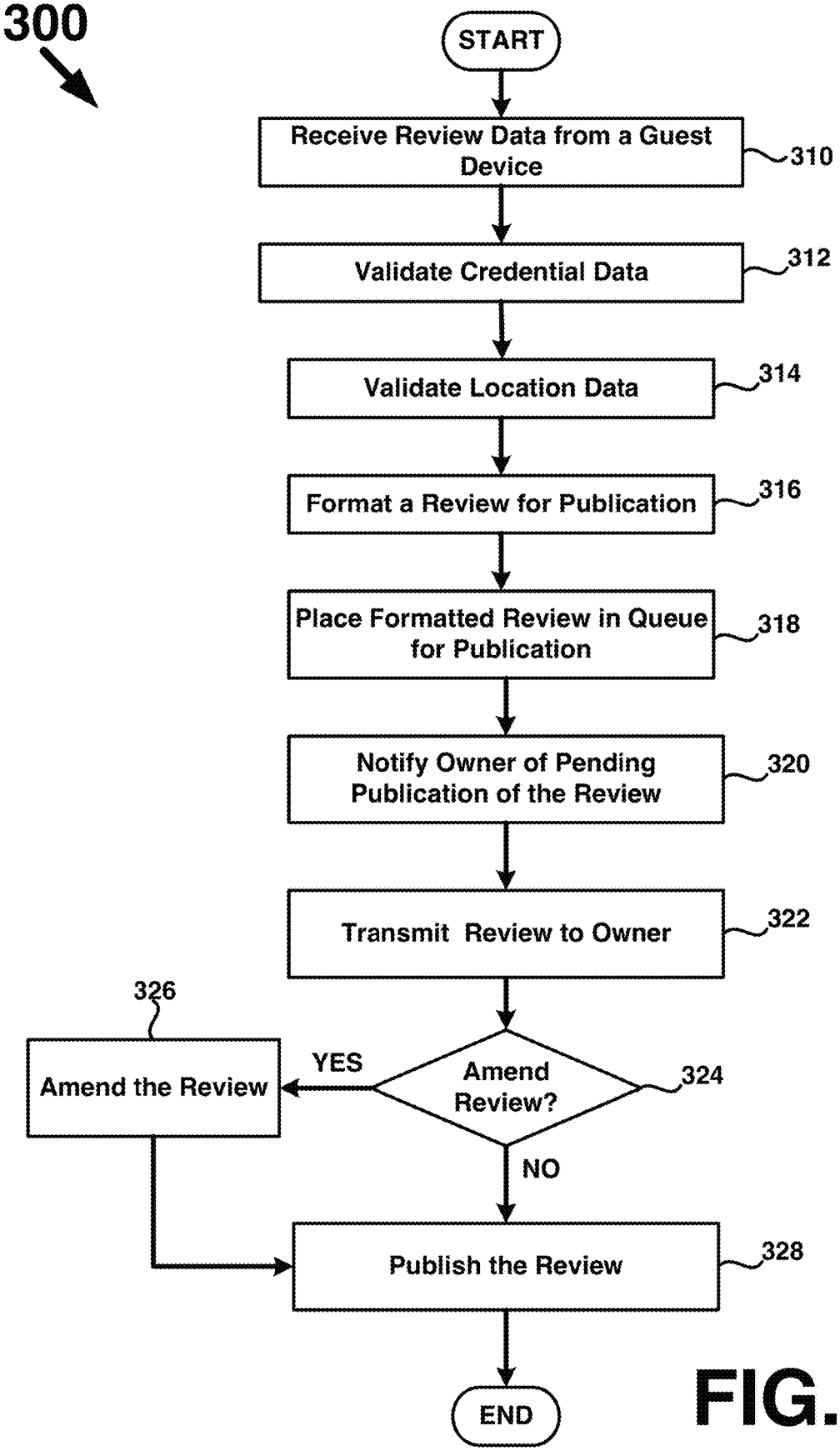
FIG. 3A depicts one example of a flow diagram for generating a review using data from an in-situ evaluation.

Turning now to FIG. 3A where one example of a flow diagram 300 for generating a review using data from an in-situ evaluation is depicted. At a stage 310 review data may be received (e.g., by networked system 150) from a guest device (e.g., 110). The review data (e.g., 119 and/or 123 in FIG. 1A) may include but is not limited to media content, credential data, location data, free text, structured text, and metadata, for example. APP 126 may format review data into packets, fields, headers or some other form of data structure, for example.

At a stage 312 credential data included in the review data may be validated (e.g., by comparing with credential data 168 in FIG. 1B). A computing resource in networked system 150 (e.g., server 153) may execute an algorithm to validate the credential data with data in a data store, such as credential data 168, for example.

At a stage 314 location data included in the review data may be validated (e.g., by comparing with location data 164 in FIG. 1B). GPS or other location based services or systems on a guest device or accessible by a guest device may track and/or log location data. APP 126 on a guest device may access location data and included that data in a data packet or other data structure that is include in the review data received at the stage 302, for example. A computing resource in networked system 150 (e.g., servers 155) may execute an algorithm to validate the location data with data in a data store, such as location data 164 and may determine whether or not the location data in the review data is within a locus of the location data accessed from location data 164, for example.

At a stage 316 data included in the review data may be formatted for publication. The data may include free text (e.g., as typed in or otherwise entered by the guest 101 on guest device 110), structured text (e.g., as selected by the guest 101 on guest device 110), media content (e.g., a picture of the event 120 captured by guest device 110), and metadata (e.g., data included in the image captured by the guest device 110 of other forms of metadata). A computing resource in networked system 150 (e.g., servers 155) may execute an algorithm to format the review data into a format suitable for presentation on one or more types of media and/or electronic devices. As one example, formatting may include different formats for email, a newsletter, a search engine, a web page, a device display (e.g., tablet, pad, smartphone, Smart TV, etc.). Media content may require different formatting depending on the type of media content, such as a video, a still image, an audio file, etc. Images, still or moving may be formatted from one file type to another file type, such as from GIFF to JPEG or MPEG4 to QuickTime, for example. A review may be formatted based on the aspect ratio of an image in the media content, such as a portrait or landscape orientation of the original image as captured by guest device 110, for example.

At a stage 318, a formatted review may be placed in a queue for publication. The queue may be a data store such as data storage 176, review data 162, or 192 in external resource 199, for example. Queued reviews may be accessed for publication at a later time.

At a stage 320, an owner (e.g., 103) may be notified of a pending review by a guest associated with a property, vacation rental, res, or other pecuniary interest of the owner. The notice may be an electronic message communicated (191, 193) by networked system 150 to an owner device (e.g., 113).

At a stage 322 the formatted review as it will be published at a later date/time, sans any amendments by the owner 103 and/or guest 101 may be transmitted (e.g., via 191, 193) to the owner for the owner to consider and optionally act on if the review is unfavorable or inaccurate, for example.

At a stage 324 a decision to amend the review prior to the review being published may be made. If a YES branch is taken, then flow 300 may transition to a stage 326 where the review is amended (e.g., a three-star rating is amended to a four or five-star rating). The amendment may be by the guest, the owner, or both. In some example, the amendment may be by a third party, such as a vacation rental agency acting on the consent of the guest and/or owner. The taking of the YES branch may include at the stage 326, the owner/agent for owner contacting the guest to cure a cause of an unfavorable review. After the cause has been cured to the guest's satisfaction, the guest or the owner may amend the review accordingly, that is, to reflect a more favorable review, for example.

After the stage 326 or if the NO branch is taken from the stage 324 the review may be published in its original form if the NO branch was taken or in its amended form if the YES branch was taken from the stage 324.

Figure 3B:
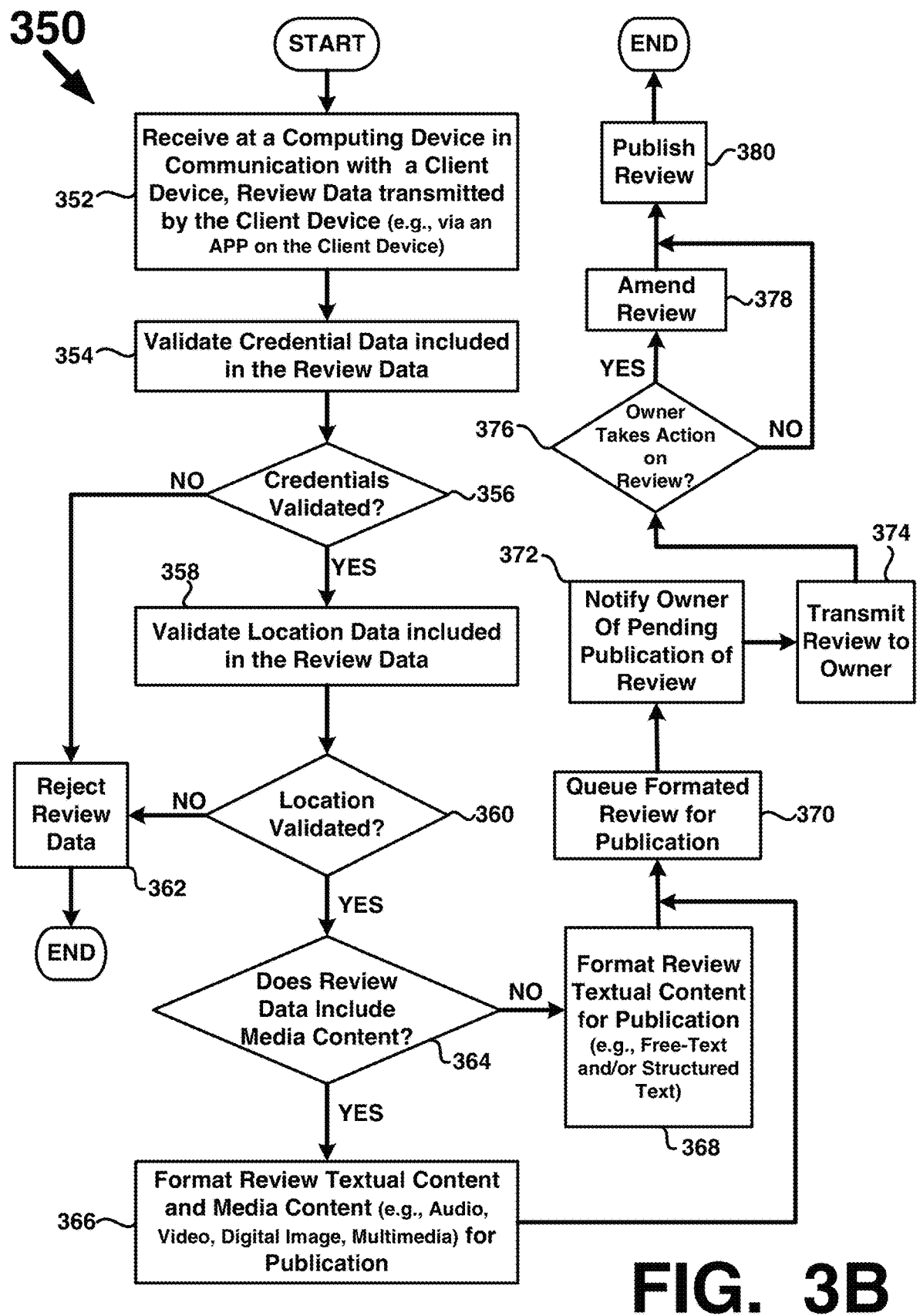
FIG. 3B depicts another example of a flow diagram for generating a review using data from an in-situ evaluation.

Reference is now made to FIG. 3B where another example of a flow diagram 350 for generating a review using data from an in-situ evaluation is depicted. At a stage 352 a computing device (e.g., a networked computing device, such as 153, 159 or 155 of FIG. 1B or 200 of FIG. 2) may receive review data (e.g., 119) transmitted by a client device (e.g., 110) the computing device is in communications (e.g., 191, 193) with. The review data that is received may have been packaged for communication by an application or other executable code executing on a processor of the client device (e.g., APP 126 on client device 110).

At a stage 354 credential data in the review data may be validated as was described above, for example. At a stage 356, if the credential data is not validated (e.g., does not match credentials in credential data 168), then a NO branch may be taken from stage 356 and the review data may be rejected (e.g., not acted on) at a stage 362 and flow 350 may terminate. If the credential data is determined to be valid, a YES branch may be taken to a stage 358.

At the stage 358 location data in the review data may validated as was described above. At a stage 360, if the location data is determined to not be valid (e.g., the location data is not within the locus for the event), then a NO branch may be taken to the stage 362, the review data rejected, and flow 350 may terminate. On the other hand, if the location data is valid, then a YES branch may be taken to a stage 364.

At the stage 364 a determination may be made as to whether or not the review data includes media content (e.g., image 112*i*). If media content is included in the review data a YES branch may be taken to a stage 366 were the review data may be formatted for textual content (e.g., free text and/or structured text) and media content (e.g., images, video, sound, etc.). If no media content is included in the review data, then a NO branch may be taken to a stage 368 where the review data may be formatted for textual content.

At a stage 370, the formatted review (e.g., review with text content only or review with both text and media content) may be queued for publication. The formatted review may be queued for publication at a later time (e.g., 12 hours later) or a later date (e.g., 2 days later).

At a stage 372 an owner (e.g., 103) may be notified (e.g., by an electronic message) of a pending review that will be published at a future date/time. At a stage 374, the review that will be published may be transmitted to the owner (e.g., emailed, placed in folder or directory in a data store, such as Cloud location, etc.). At a stage 376 the owner may decide whether or not to take action on the review before it is published. If the owner takes no action (e.g., the review is a favorable four or five-star review), then a NO branch may be taken to a stage 380 where the formatted review that was queued for publication at the stage 370 will be published on schedule (e.g., in 12 hours or 2 days). However, if the owner decides to take action (e.g., the review is not favorable two-star review), then a YES branch may be taken to a stage 378 where the review may be amended as was described above. After the stage 378, the amended review may be published at the stage 380. As was described above, the taking of the YES branch from the stage 376 may include the owner taking action to cure some aspect of the stay that led the guest to give a less than favorable review (e.g., three-stars or less rating or text/structured text that did not give a favorable opinion of the event).

Figure 3C:
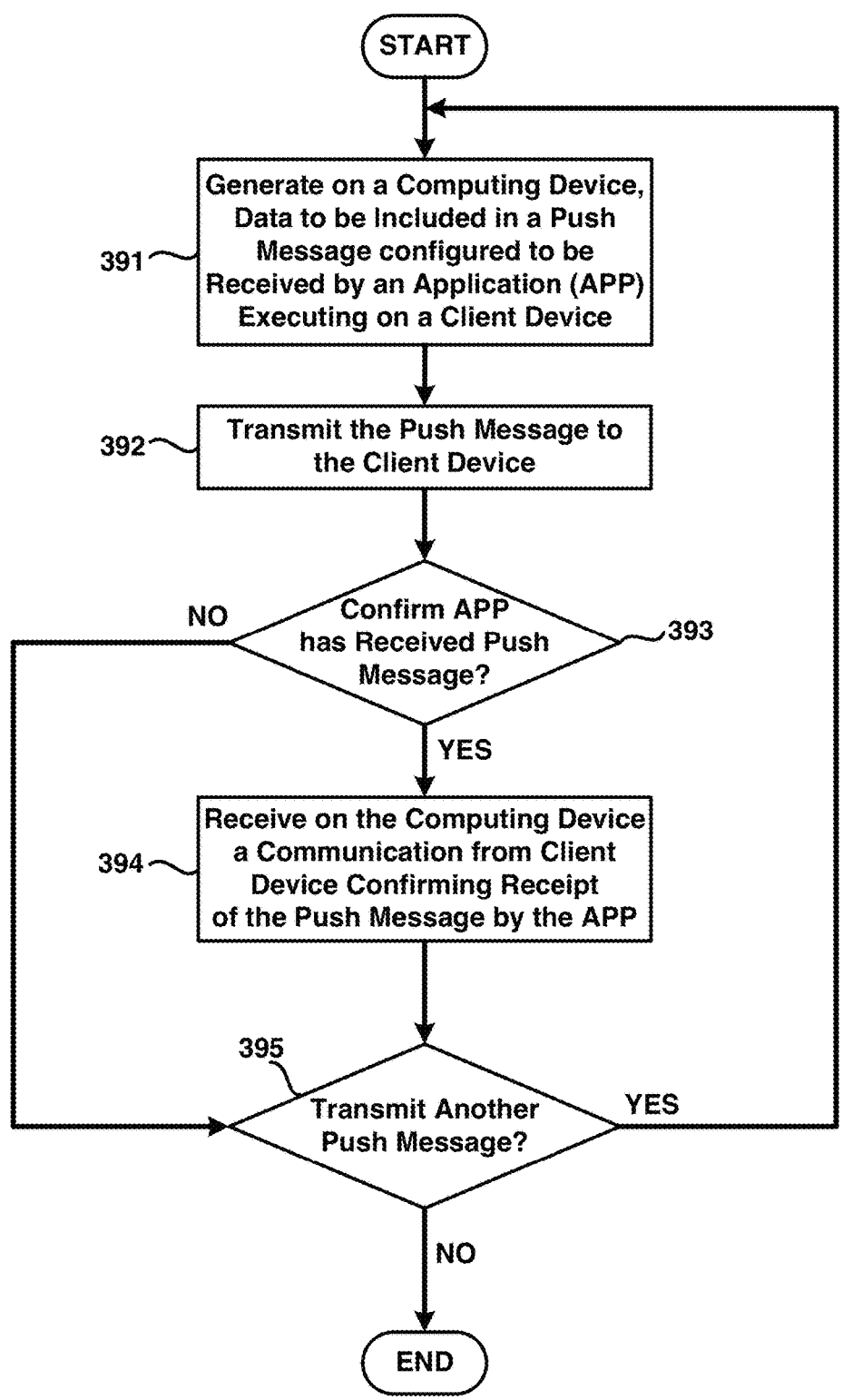
FIG. 3C depicts one example of a flow diagram for generating a push message.

Attention is now directed to FIG. 3C where one example of a flow diagram 390 for generating a push message is depicted. At a stage 391 a computing device (e.g., networked computing device 153) generates a push message that is configured to be received by an application (e.g., APP 126) executing on a client device (e.g., 110). Generation of the push message may include formatting the push message into a data structure, packets, headers, etc. the application is configured to process.

At a stage 392, the push message may be transmitted (e.g., 191, 193) to the client device. At a stage 393 a determination may be made as to whether or not confirm of receipt of the push message by the application. If confirmation of receipt is not requested (e.g., in a packet of data included in the push message), then a NO branch may be taken to a stage 395, where a determination may be made as to whether or not to transmit another push message. If confirmation of receipt is requested, then a YES branch may be taken to a stage 394 where the computing device may wait to receive a communication from the client device that confirms receipt of the push message by the application. Stage 394 may transition to the stage 395, where if a YES branch is taken, another push message may be transmitted at the stage 391. If a no branch is taken from then stage 395, then flow 390 may terminate.

A push message may include data regarding an event (e.g., a restaurant the owner recommends), an advertisement or deal for goods (e.g., local organic farmers market or services (e.g., a maid service) that may be in the same general locale of the event (e.g., the same town or block as the vacation rental).

Figure 4:
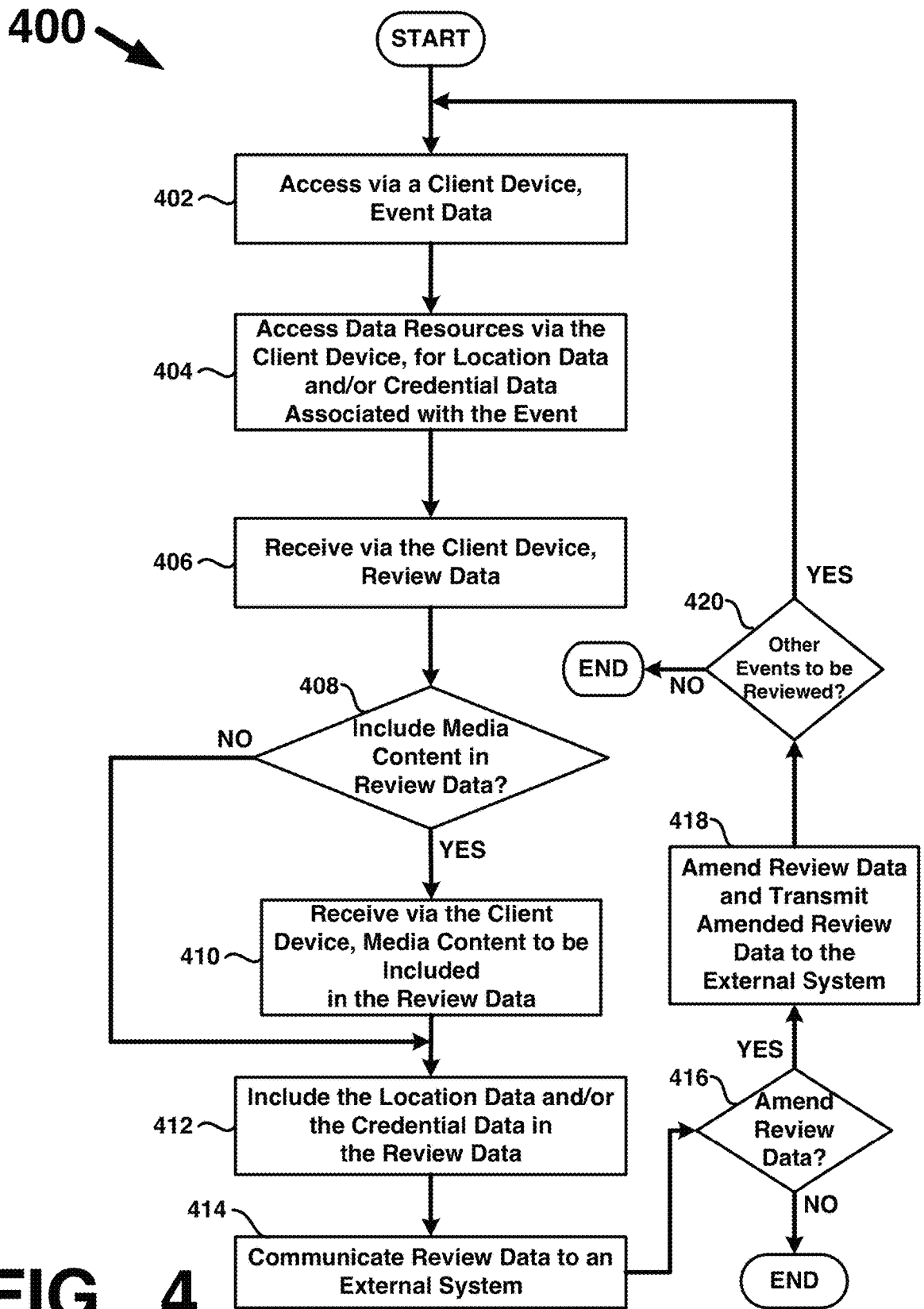
FIG. 4 depicts one example of a flow diagram for generating review data.

Referring now to FIG. 4 where one example of a flow diagram 400 for generating review data is depicted. At a stage 402 event data is accessed via a client device (e.g., 110). For example, an application (e.g., APP 126) executing on a processor of the client device may access event data (e.g., 117 of FIG. 1A). The event data may be located in networked system 150 and/or external resource 199, for example.

At a stage 404, data resources are accessed via the client device for location data (e.g., from location 164) and credential data (e.g., credentials 168). For example, client device may use its communications resources such as WiFi or wired links (191, 193) to access the data resources from networked system 150 and/or external resource 199.

At a stage 406, review data (e.g., free text, structured text) may be received on the client device (e.g., via keyboard 115, microphone 137, star rating menu 124, etc. At a stage 408 a determination may be made as to whether or not to include media content in the review data. If a NO branch is taken, then stage 408 may transition to a stage 412. On the other hand, if a YES branch is taken, then flow may transition to a stage 410 where the client device may receive media content (e.g., via camera 112) to be included in the review data. In some examples, the media content may be received by the client device as an electronic message that include the media content (e.g., as an attachment, a file, etc.). For example, an image to be included in the review data may be received by the client device as a text message that includes the image.

At the stage 412, location data and/or credentials data are included in the review data. At a stage 414 the review data is communicated (e.g., 191, 193) to an external system (e.g., networked system 150 and/or external resource 199). At a stage 416 a determination may be made as to whether or not to amend the review data. If a NO branch is taken, then flow 400 may terminate. If a YES branch is taken, then at a stage 418 the review data may be amended and then transmitted to the external system. The amended review data may replace the previously communicated review data on the external system.

At a stage 420 a determination may be made as to whether or not other events are to be reviewed (e.g., by guest 101). If a NO branch is taken, then flow 400 may terminate. If a YES branch is taken, then flow 400 may transition to another stage, such as back to the stage 402, for example. The stage 416 may arise due to an owner taking action to cure some aspect of an event and the guest subsequently amending the review to reflect the cure (e.g., to increase the star rating from 2 to 5).

Figure 5A:
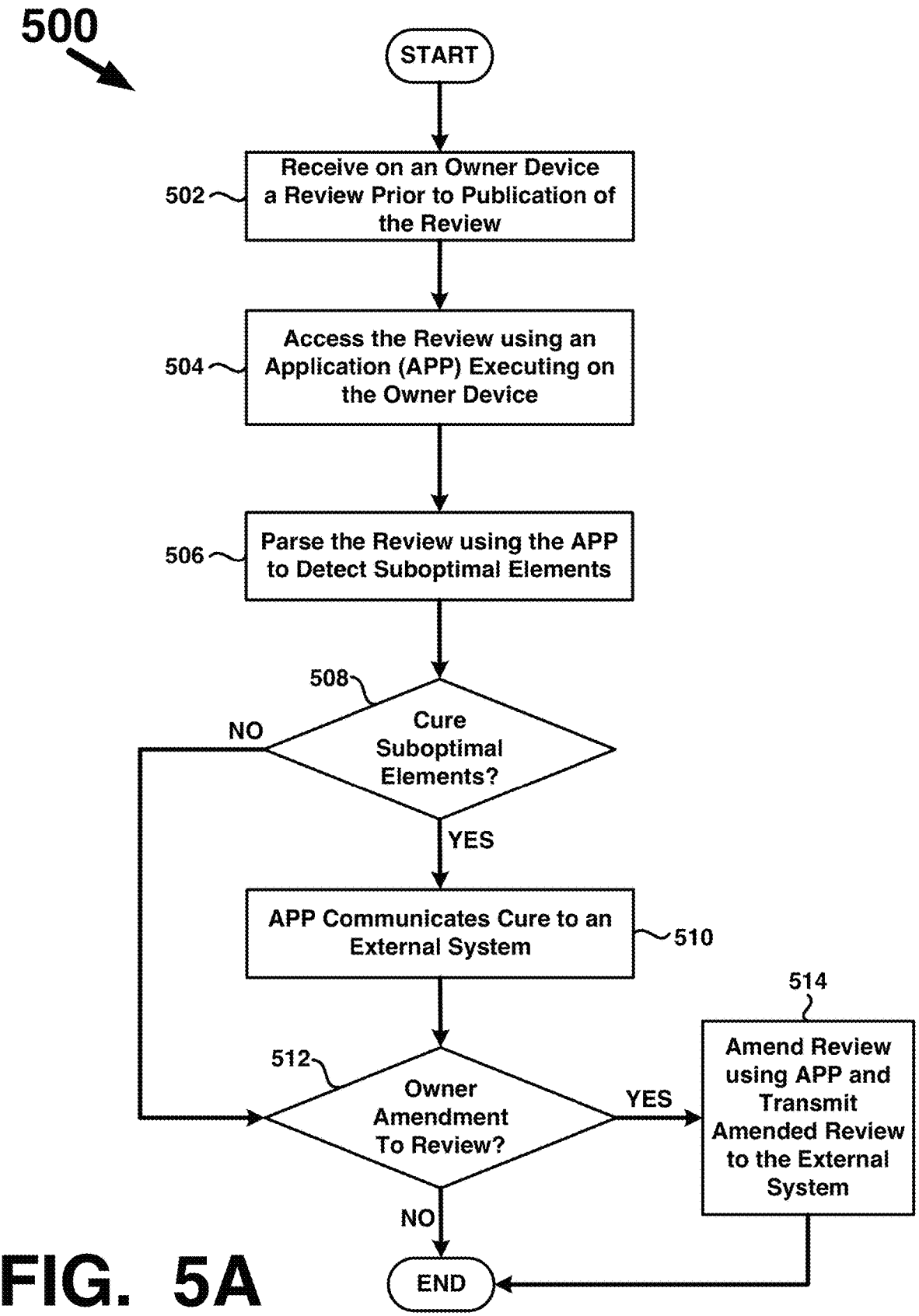
FIG. 5A depicts one example of a flow diagram for an application that receives review data an optionally provides amended review data.

Turning now to FIG. 5A where one example of a flow diagram 500 for an application that receives review data an optionally provides amended review data is depicted. Flow 500 may be implemented as an application (APP) that executes on an owner device (e.g., APP 146 on owner device 113). At a stage 502 a review may be received on an owner device prior to publication (e.g., broader circulation of the review to an interested clientele) of the review. Networked system 150 may communicate 121i the review to the owner device. Data (121, 123) exchanged (121i, 123o) between networked system 150, owner device 113 and APP 146 may occur in a manner similar to that described above for client device 110 and APP 126, for example. At a stage 504, the application may access the review. At a stage 506 the application may parse the review to detect suboptimal elements (e.g., a low 1 to 3 star rating in structure text, key words in free text like "disappointed" or "hated", etc.). At a stage 508, action may be taken by an owner or agent acting on behalf of the owner to cure the suboptimal elements detected in the review. If a YES branch is taken, then flow 500 may transition to a stage 510, where the application may communicate the cure to an external system (e.g., 150). If a NO branch is taken, then flow 500 may transition to a stage 512 where the owner may opt to amend the review. If a NO branch is taken, then flow 500 may terminate. If a YES branch is taken, then at a stage 514 the review may be amended using the application and the amended review may be transmitted to the external system.

The review if amended by the owner 103 may be subject to further scrutiny before publishing the amended review to ensure that the guest 101 concurs with the amended review. For example, if the guest 101 gave a two-star rating the owner amended review has a five-star rating, then the guest 101 may receive a copy of the owner amended review (e.g., via client device 110 and APP 126) to allow the guest 101 to accept or reject the amended review. If the guest 101 agrees with the amended review, then the guest may indicate (e.g., using a UI presented by APP 126) acceptance of the amended review. On the other hand, if the guest 101 does not agree with the amended review, then the guest may indicate (e.g., using a UI presented by APP 126) rejection of the amended review and/or provide their own comments, corrections, or amendments to be used in future round of amending of the review. An amended review that is rejected by the guest 101 may result in the original review by the guest 101 being published and the owner amended review being discarded. An owner amended review received by networked system 150 may also be subject to location verification and credential verification as described herein.

Figure 5B:
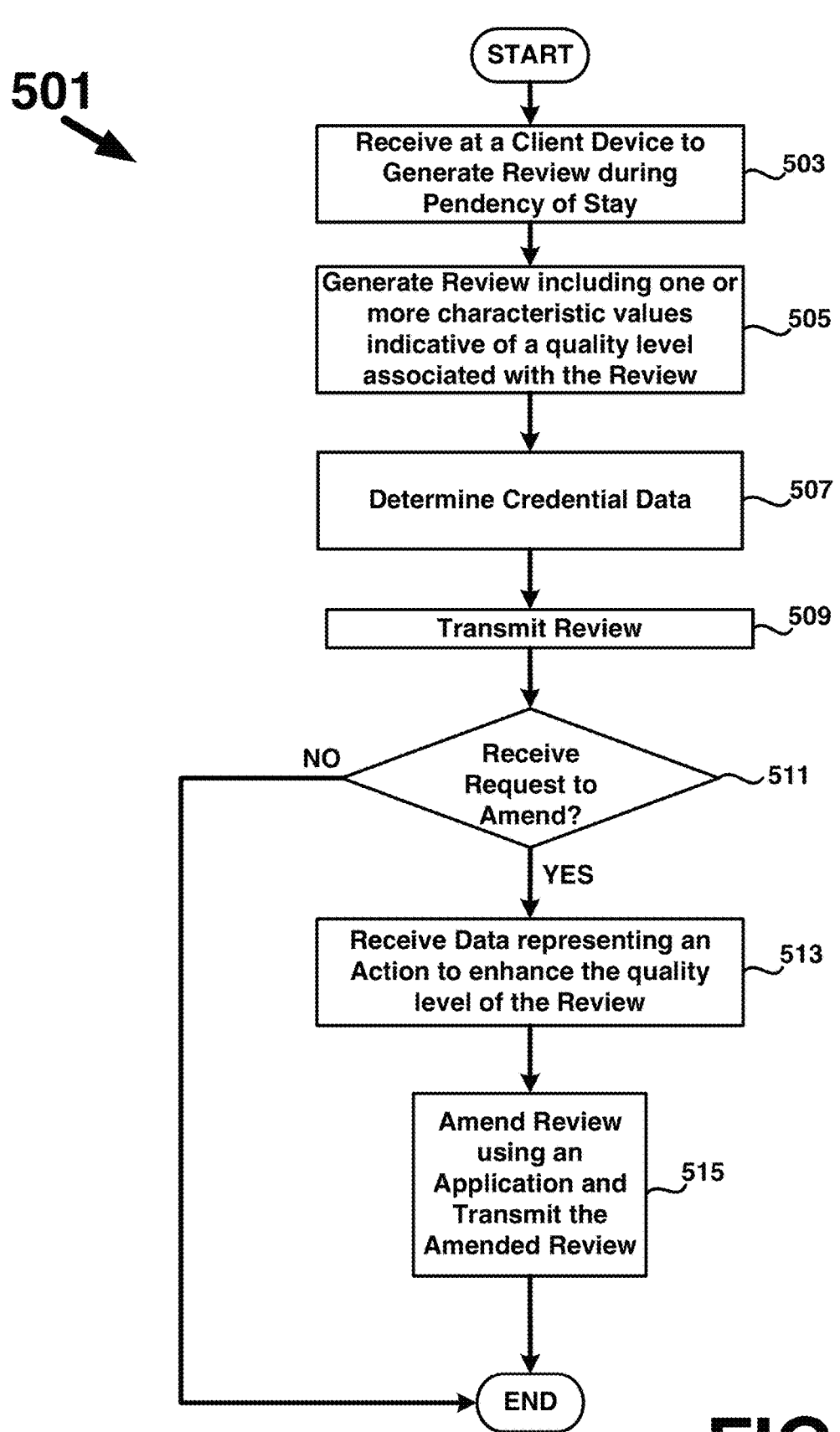
FIG. 5B depicts one example of a flow diagram for an application that receives a request to generate review data during a pendency of a stay.

Referring now to FIG. 5B where one example of a flow diagram 501 for an application that receives a request to generate review data during a pendency of a stay is depicted, according to some embodiments. The flow diagram of FIG. 5B depicts flow 501 at a mobile computing device to provide authenticated reviews of, for example, a traveler's evaluation of a rental property during a pendency of the traveler's stay, for example, the traveler may be the guest 101. The review during the pendency of stay facilitates the capture of the traveler's enjoyment of a rental property (e.g., during vacation) or some other event (e.g., a meal at a restaurant), as well as any suboptimal experiences the traveler may have. At a stage 503, a client device (e.g., client device 110) implementing an application (e.g., APP 126), according to various embodiments described herein, is configured to generate a review or an evaluation. In some examples, a review is generated at a stage 505 by including text and/or symbols, or other data representing one or more characteristic values that are indicative of a quality level associated with the review. In some cases, a value of a quality level may be determined by performing linguistic analysis to determine, for example, a number or degree of negatively-associated words (e.g., words in free-text) in a review relative to a number or degree of positively-associated words. Or, in other cases, a value of a quality level may be determined as a numeric representation, such as a percentage or as a rating (e.g., a star rating system). For example, an aggregated score may be calculated by aggregating a number of parameter or characteristic values each of which may be associated with a quality metric (e.g., degree of cleanliness, degree of functionality of HVAC systems, degree representing the ease-of-use for operating the rental property, etc.). Note that there are a variety of ways to determine a value of quality level. At a stage 507, credential data is determined. For example, credentialed data may include GPS location data, a MAC ID of a traveler's device (e.g., a smartphone), Bluetooth address of a traveler's device (e.g., a tablet or pad), a MAC ID of a router (e.g., a WiFi access point at the rental unit), location services accessed by client device or by an application executing on the client device (e.g., APP 126), cellular network location data, device address data, and other like information. Flow 501 may include a stage where location data is validated as was described above for stage 314 of FIG. 3A, for example. In various embodiments, the credentialed data may be used by, for example, an owner computing system to authenticate that a purported review has been generated by an authentic traveler rather than, for instance, a fraudulent review by a reviewer who did not stay at the rental property or experience a particular event. At a stage 509, the mobile computing device may transmit the review via a wireless communication link. At a stage 511, a determination is made whether a request to amend the review is received. If not, flow 501 terminates, otherwise, flow 501 continues to a stage 513 at which data representing an action is received. In some cases, if the traveler is dissatisfied with a portion of the rental property, an owner may transmit a request to amend the review and may also take some sort of action to resolve the dissatisfaction (e.g., act to cure the dissatisfaction). The data representing an action may be configured to enhance the quality level of the review, and may include a variety of representative actions or confirmation of actions taken. For example, an action may include a transmission of data representing a refund amount to a financial account associated with the traveler. Other actions are also possible. At a stage 515, a traveler (e.g., guest 101) may generate an amended review with, for example, a revised value of the quality level that exceeds a threshold (e.g., 80% satisfaction or a higher star rating, increased from three-stars to five-stars). The amended review may be generated by an application executing on the traveler's device (e.g., APP 126 on client device 110). The amended review, therefore, facilitates a more positive the review than otherwise might be the case.

Figure 6:
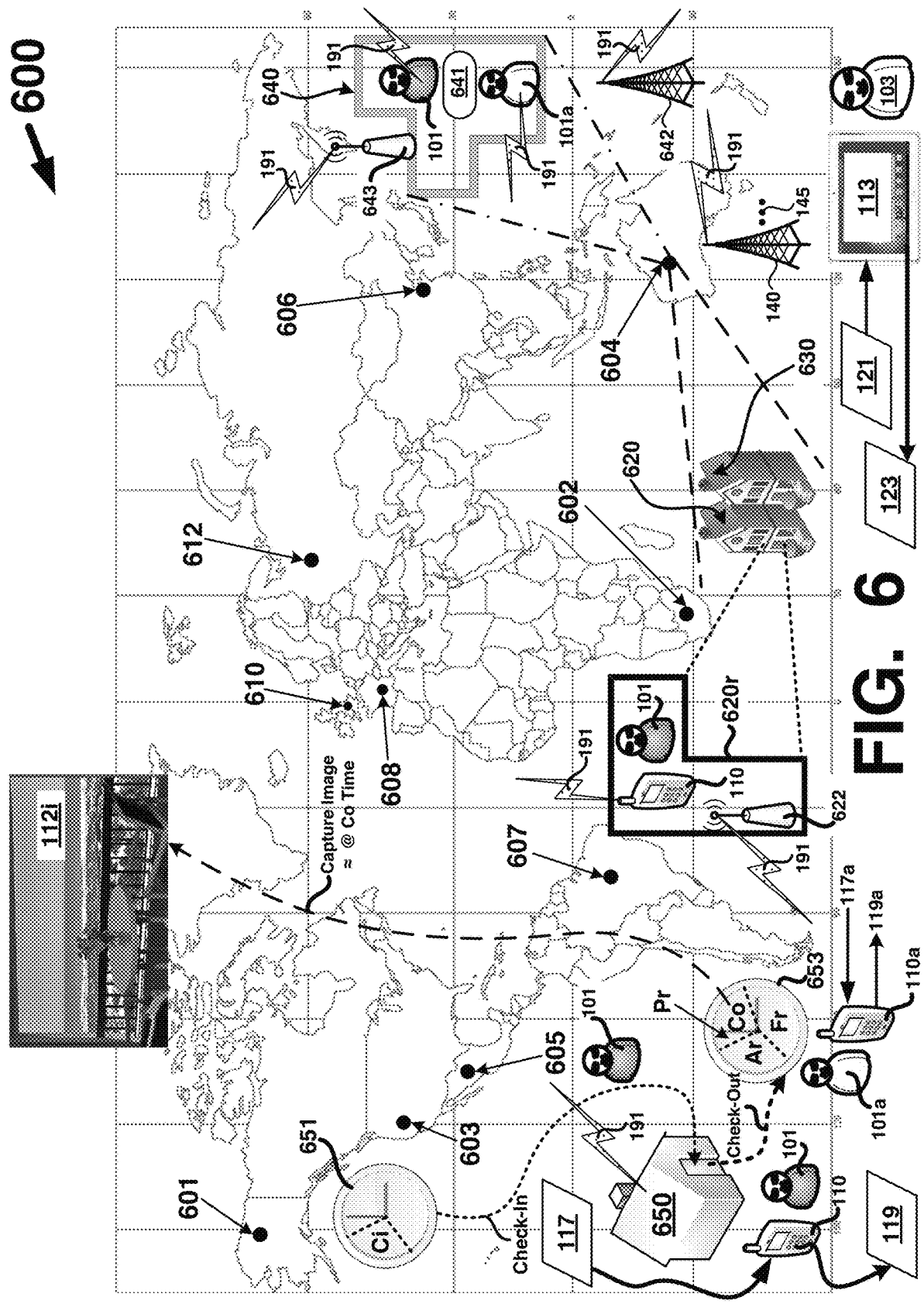
FIG. 6 depicts examples of locations for events.

Attention is now directed to FIG. 6 where examples 600 of locations for events 601-612 are depicted. Events 601-612 may be stays at vacation rental properties in locations such as 601 in Alaska, 603 in California, 605 in Mexico, 607 in Brazil, 602 in South Africa, 604 in Australia, 606 in China, 608 in France, 610 in the United Kingdom, and 612 in Russia. Associated events may occur in a locale of the events 601-612. Each event location (e.g., city, town, venue, etc.) may include a plurality of events that are occurring at the same time, and some of the events may be in the same general location (e.g., Union Square in San Francisco, Calif.) of one another.

For events that are related to stays at a rental property, there may be standard terms for occupancy, such as a stay date range and check-in and check-out times. As one example, for an event 650, on the beginning date of the stay, the guest 101 has a check-in time Ci denoted on clock 651 and the guest 101 enters the event 650 (e.g., a stay at a rental home) at that check-in time. Clock 653 denotes a check-out time Co for the guest to exit the event 650 on the ending date for the stay where the guest 101 ends occupancy of the event 650.

The event 650 may include communications access 191 for client device 110 that may be used by the guest 101 to enter review data using client device 110. Prior to the check-out time Co the APP 126 on executing on client device 110, the networked system 150 or both may prompt a review Pr of the event by signaling or otherwise messaging the guest 101 to generate a review of his/her stay at the event 650 contemporaneously with the stay, that is, before the guest 101 actually checks-out Co. The prompt for the review Pr may include a prompt for the guest 101 to capture an image of a favorite or memorable aspect of the stay at the event 650, such as a picture 112i of an ocean/beach view from a room at the event 650 (e.g., a bedroom balcony). The prompt for the review Pr may be timed for activation by the APP 126 at a time before the check-out time Co (e.g., one to two hours before Co) or be included in incoming data 117 received by client device 110, for example. After the guest has captured the image 112i (e.g., at a time approximately at or around check-out time) and entered review text and/or vocal commentary, the review data may be transmitted (e.g., 119) to networked system 150 for processing and subsequent formatting Fr of the review for publication. The prompt for the review Pr may occur while the guest 101 is still in-situ at event 650 and may occur minutes or hours before the designated check-out Co time.

An advantage of the in-situ evaluation of the event before the guest 101 has departed the event 650 is that feelings, impressions, experiences associated with the stay at the event 650 may still be fresh and/or strong in the mind of the guest 101 and/or an associate 101a of the guest 101 and therefore may lead to a more accurate and positive review than would be the case if the guest 101 and/or associate 101a submitted the review at a later date (e.g., days or weeks later). If the owner 103 provided a five-star property for event 650 and the guest 101 at the time of the stay also feels the event 650 is worthy of a five-star review, then the best time to capture that sentiment may be in-situ while the guest 101 is still present at the event 650. Similarly, associate 101a may also have a similar sentiment and the best time to capture that sentiment may be while the associate 101a is in-situ at the event 650. Associate 101a may have client device 101a and that device may receive data 117a and transmit data 119a and the associate 101a may be prompted Pr to generate an in-situ review in a manner similar to that for guest 101.

Another advantage of the in-situ evaluation of events is that after the submission of the event (e.g., by transmitting data 119, 119a), the networked system 150 may process the received review data and format the review Fr for publication. Therefore, at some time after check-out Co (e.g., minutes to hours later), a formatted review may be ready for publication to a broader audience. Owner 103 may receive notice and a copy of the formatted review Fr for consideration and may take action to cure any issues that arose during the guest's 101 stay at the event and/or negotiate with the guest 101 to amend the review Ar, prior to its publication in its present form. The time from prompting the review Pr to publishing the formatted review Fr in its original or amended form Ar may be a matter of a few hours or less instead of days or weeks as may be the case when a guest 101 submits a review long after the guest 101 has departed the event 650. The review captured in-situ may be more accurate as the guest 101 may be in a good mood while still at the event 650 and that mood may change post event and lead to an inaccurate review.

Further to example 600, an event in location 604 may include a stay at a town house rental property denoted as event 620. A room 620r at the event 620 may include a wireless access point 622 that may communicate wirelessly with client device 110, networked system 150 and/or external resource 199 (not shown). Prior to check-out time Co from event 620, guest 101 may capture in-situ media content and enter review textual content while present at event 620 (e.g., from inside room 620r). Location data and/or credential data may be included in the review data (e.g., 119) communicated by APP 126 via client device 110 and that data may be verified by networked system 150 (e.g., the location data is consistent with the client device being within a locus of the location for event 620 and/or room 620r). Similarly, credential data may be verified by wireless device address of client device 110 being received by access point 622, by RSSI, by access credentials stored in memory of client device 110 being accessed by APP 126 and included in the data 119 received by networked system 150, for example. While at location 604, guest 101 and/or associates 101a of the guest 101 may be mobile and may travel to other events at location 604, such as a restaurant event 640 in which guest 101 and associate 101a are seated at a table 641. Wireless access point 643 may communicate 191 with client devices (110, 110a) and with networked system 150 to verify credential and location data associated with a review of the restaurant event 640 by the guest 101/associate 101a. During stay at location 604 other communications resources, such as cellular networks 642 and/or 140 may be used to verify location data (e.g., the client device 110 associated with guest 101 is in vicinity of one or more of the cellular networks 642 and/or 140b). Data (117, 119) may be communicated to/from networked system 150 and/or client device 110 using one or more of the cellular networks. Location based services accessible by client devices (110, 110a) and/or APP 126 may be used to access location data for use in verifying location for reviews or other purposes.

A review of restaurant event 640 may be in-situ and be formatted and queued for publication in a manner similar to that described above. A push message (e.g., in data 117) may be received by APP 126 on client device 110 and that message may include information on the restaurant event 640 that may be used to inform the guest 101 of the location, menu, hours of operation, contact information, prices, etc. for the restaurant event 640. The push message may include a discount, offer or other incentive for the guest 101 to motivate the guest 101 to patronize the restaurant event 640. Owners of venues such as the restaurant event 640, for example, may receive formatted reviews prior to publication and may take action to cure grievances and/or amend reviews.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A computer-implemented method comprising:
as performed by a computing system comprising one or more computing devices configured to execute specific instructions,
receiving, at a networked computing device, review data transmitted by a client device, wherein the review data is generated by an application executed on the client device, and wherein the review data is associated with a rental location;
extracting credential data and network data from the review data, wherein the credential data comprises data regarding the client device, and wherein the network data comprises:
data identifying a network to which the client device is connected; and
data representing a signal strength of a network connection of the client device to the network;
determining that the credential data corresponds to access credentials stored in a data storage resource;
determining, based at least partly on the network data, that the network to which the client device is connected is a wireless network at the rental location;
determining, based at least partly on the network data, that the signal strength of the network connection satisfies a threshold;
determining, based at least partly on the signal strength satisfying the threshold, that the client device is within a predetermined proximity of the rental location;
determining, based at least partly on (1) the credential data corresponding to the access credentials and (2) the client device being within the predetermined proximity of the rental location, to initiate publication of at least a portion of the review data;
formatting at the networked computing device, text content and media content included in the review data into a review data file;
queuing the review data file for publication;
communicating a notice of a pending publication of the review data file to an owner device associated with an owner of the rental location;
receiving, from the owner device, review action data regarding an action to be taken with respect to the review data file;
determining, based at least partly on the review action data, to publish the review data file; and
publishing the review data file.

2. The computer-implemented method of claim 1, wherein the receiving the review data occurs during a time at which the rental location is rented to a renter account associated with the client device.

3. The computer-implemented method of claim 1, further comprising:
transmitting via the communications link, a message operative to cause capture of the media content by the client device.

4. The computer-implemented method of claim 1, wherein the formatting includes formatting at least one of free text or structured text.

5. The computer-implemented method of claim 1, wherein the formatting includes formatting the review data into a device specific review data file for the client device.

6. The computer-implemented method of claim 1, further comprising:
communicating the review data file to the owner device.

7. The computer-implemented method of claim 6, further comprising:
receiving an amended review data file transmitted by the client device.

8. The computer-implemented method of claim 1, further comprising:
receiving an amended review data file transmitted by the client device responsive to a request message transmitted by the owner device requesting amendment to the review data file.

9. The computer-implemented method of claim 1, wherein the receiving the review action data comprises receiving data regarding at least one of: publishing the review data file, revising the review data file, adding a response to the review data file, or requesting a revision to the review data file.

10. A system comprising:
a data storage resource;
a communications interface; and
one or more computer processors in communication with the data storage resource and the communications interface, wherein the one or more computer processors are configured to execute instructions embodied in a non-transitory computer readable medium to at least:
receive review data from a first computing device via the communications interface, wherein the review data is associated with an event;
determine that credential data included in the review data matches an access credential, in the data storage resource, associated with the first computing device;
determine, based at least partly on network data included in the review data, that a network to which the first computing device is connected is a wireless network at the event;
determine, based at least partly on the network data, that a signal strength of the network connection satisfies a threshold;
determine, based at least partly on the signal strength satisfying the threshold, that the first computing device is within a predetermined proximity of the event;
generate a review data file using the review data, queue the review data file for publication;
communicate via the communications interface, to a second computing device associated with a user account, a notice of a pending publication of the review data file, wherein the user account is associated with the event;
receive, from the second computing device, review action data regarding an action to be taken with respect to the review data file;
determine, based at least partly on the review action data, to publish the review data file; and
publish the review data file.

11. The system of claim 10, wherein the executable instructions to generate the review data file comprise executable instructions to format text content included in the review data, wherein the text content that is formatted includes free text, structured text or both.

12. The system of claim 10, wherein the executable instructions to generate the review data file comprise executable instructions to convert media content, included in the review data, from one file type to another file type.

13. The system of claim 10, wherein the executable instructions to generate the review data file comprise executable instructions to convert media content, included in the review data, from one aspect ratio to another aspect ratio.

14. The system of claim 10, wherein one or more computer processors are further configured by the executable instructions to at least:
receive amended review data, via the communications interface, from one of the first computing device or the second computing device;
determine that credential data included in the amended review data matches an access credential in the data storage resource;
determine that location data included in the amended review data indicates the first computing device or second computing device is within a predetermined proximity of a location associated with the user account;
format the amended review data into an amended review data file, and
queue the amended review data file for publication.

15. The system of claim 10, wherein the executable instructions are included in an application program interface.

16. The system of claim 10, wherein the one or more computer processors are further configured by the executable instructions to at least:
generate a push message configured to be received by an application; and
transmit the push message via the communications interface to an external device in communications with the communications interface via a wireless communications link.

17. The system of claim 16, wherein the application is executed on a processor of the external device, and wherein the external device comprises the first computing device or the second computing device.

18. The system of claim 10, wherein one or more computer processors are further configured by the executable instructions to at least:
receive, via the communications interface, a confirmation of receipt of a push message by an application executing on a processor of an external device in communications with the communications interface via a wireless communications link.

19. The system of claim 10, wherein the review data that is received is generated by an application executing on a processor of an external device in communications with the communications interface via a wireless communications link.

20. The system of claim 10, wherein the action to be taken with respect to the review comprises at least one of: publishing the review, revising the review, adding a response to the review, or requesting a revision to the review.

* * * * *